June 15, 1926.
R. TOSSELL
1,588,506
BUMPER FOR MOTOR VEHICLES
Filed August 11, 1921  2 Sheets-Sheet 1
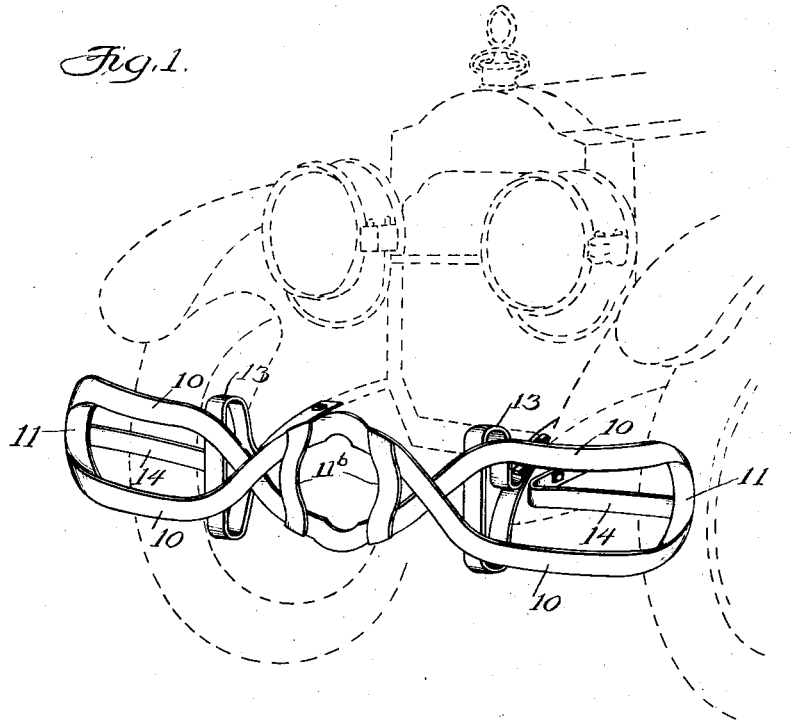
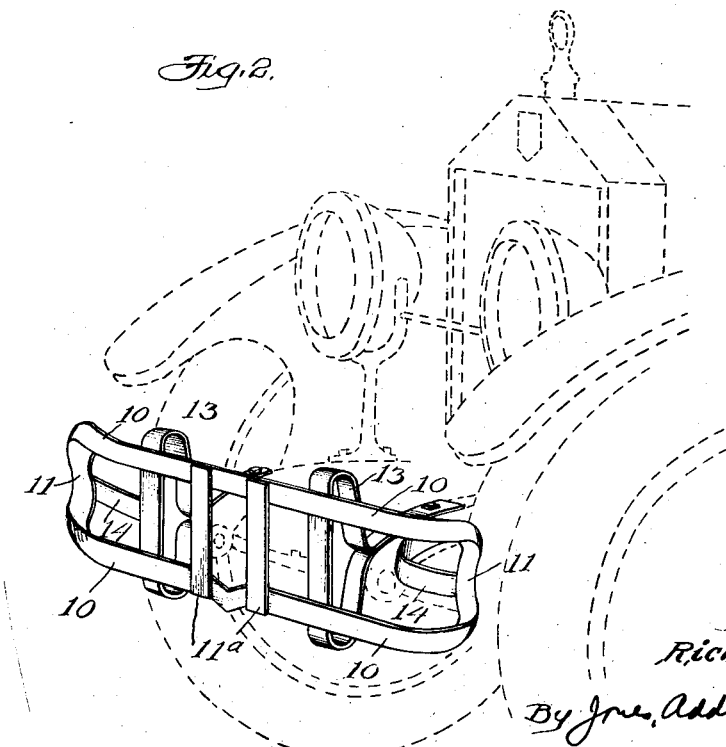

June 15, 1926.
R. TOSSELL
1,588,506
BUMPER FOR MOTOR VEHICLES
Filed August 11, 1921   2 Sheets-Sheet 2
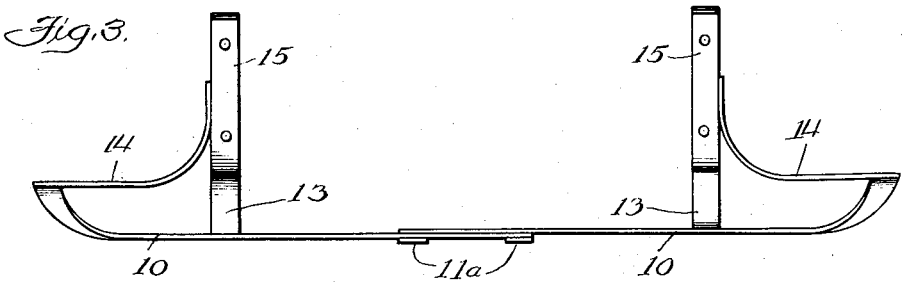
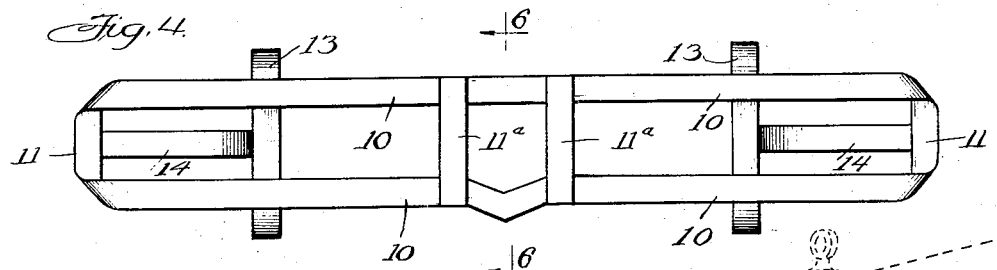
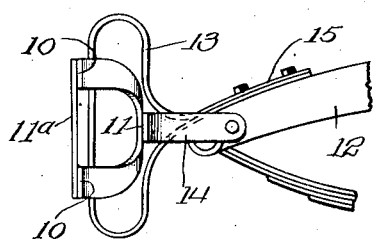
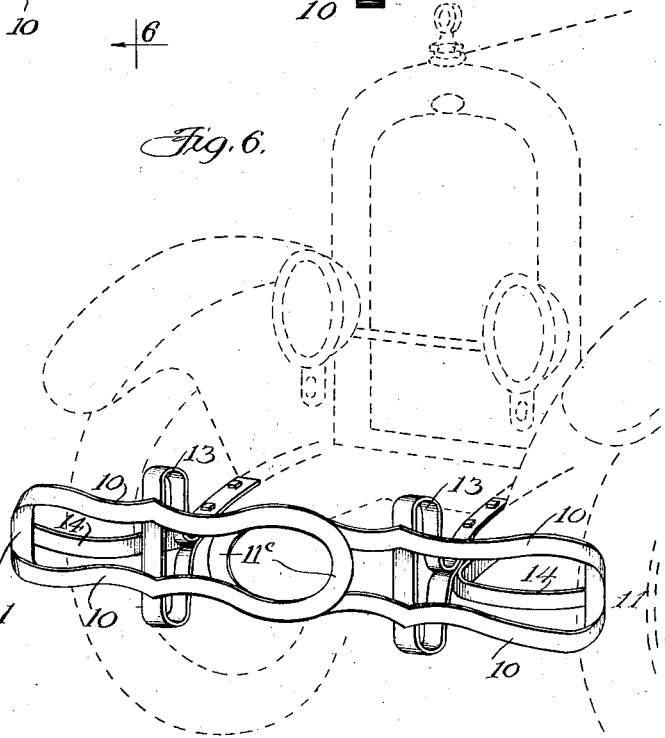
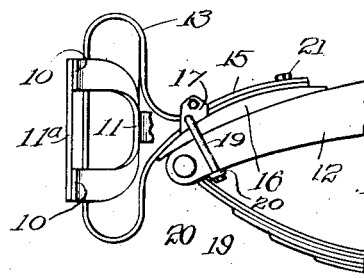
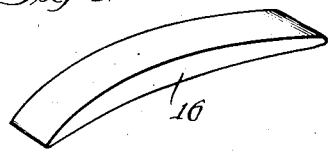
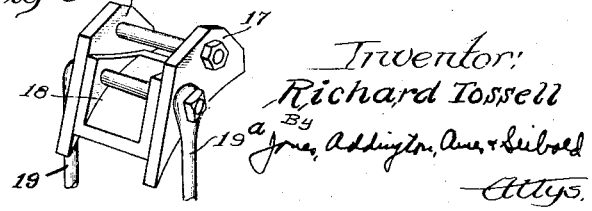
Inventor:
Richard Tossell Patented June 15, 1926.

1,588,506

UNITED STATES PATENT OFFICE.

RICHARD TOSSELL, OF CHICAGO, ILLINOIS.

BUMPER FOR MOTOR VEHICLES.

Application filed August 11, 1921. Serial No. 491,411.

This invention relates to bumpers for automobiles and consists of improvements whereby efficiency of protection, cheapness of manufacture and enhancement of appearance are secured.

The bumper preferably is of the two-bar type, in which the bars are flat metal strips of suitable material and of sufficient size and strength for the purpose. The ends of the bumper are preferably formed by folding the horizontal or longitudinal members diagonally over and back, whereby graceful curves are imparted to the ends and corners of the bumper, and the horizontal bars are connected by a substantially vertical continuation thereof. This is readily accomplished by utilizing a single bar for each end of the bumper, which bar is folded and bent intermediate its ends to form one complete end member of the bumper. Two such members are then assembled with their longitudinal portions overlapping or suitably secured together to form the complete bumper.

While the bumper is ornamental as a whole, I prefer to shape or form the intermediate portion of the bumper into a fanciful design and I prefer also that this fanciful design be made to correspond with and thus to simulate the distinctive lines, name plates or insignia of the particular cars with which the bumpers are to be used, whereby the bumper harmonizes with the car as a whole in fitting and appearance.

Referring to the accompanying drawings:

Figure 1 is a perspective view of the front end of an automobile with one form of the bumper attached;

Fig. 2 is a similar view of another automobile with a bumper attached having a different conformation:

Fig. 3 is a plan view of the latter bumper detached from the car.

Fig. 4 is a front elevation thereof;

Fig. 5 is an end elevation of the same;

Fig. 6 is a perspective view of the front end of an automobile equipped with a different form of a bumper;

Fig. 7 is a side elevation of a bumper attaching means;

Fig. 8 is a perspective view of the curved block used to adapt the bumper to any car, and Fig. 9 is a perspective view of the supporting blocks for the spring bumper supports.

Referring now to Figs. 3 to 5, the bumper comprises the two vertically separated horizontal bars 10, preferably of flat steel, having their outer ends slightly curved to the proper or desired contour to give a slight rearward bend to the ends of the bumper and then folded or bent over to the rear on a diagonal corner curve to form the end pieces 11, which thus form vertical integral end connections between the upper and lower bars and gracefully curved ends for the bumper as a whole.

A bumper with its ends thus formed may be readily made by bending each end separately in a bar long enough to make half—more or less—of a complete bumper, and then securing the meeting ends of the upper bars and of the lower bars together. This may be done by welding, or by overlapping the ends and riveting or bolting or by merely clamping the overlapping ends together. The bending may be readily accomplished over suitable forms when the bars are heated.

These horizontal bars may extend straight across from end to end of the bumper or be crossed in various ways, as for example in Fig. 1 to give the bumper any desired form or appearance. I preferably also, so shape or form these horizontal bars in their medial portion to simulate a fanciful design and preferably to correspond to and follow the distinctive lines of the front end of the particular cars, or the name plates or insignia thereof, with which they are to be used, and attach to said bars 10 other metal pieces, such for example, as the vertical strips 11$^a$, Figs. 2 to 5, or 11$^b$, Fig. 1, to complete the designs, lines, plates or insignia, whereby an ornamental and distinctive appearance is imparted to the bumper and car. The strips 11$^a$, or 11$^b$, or any others which may be so applied, serve also to brace and strengthen the bars and consequently afford better protection.

In Fig. 6, a different configuration of the longitudinal bars and a different way of forming the inner ends of the bumper sections are illustrated. Here the longitudinal bars are curved as shown and their inner ends are bent into a loop and welded together as at 11ᶜ. The two loops being overlapped and secured together as by riveting, bolting or clamping, forms an elliptical shaped figure at the middle of the bar, which may conform to the name plate or insignia of the car.

These bumper bars are preferably supported from the projecting ends of the channels side bars 12 of the car, by vertical spring loops 13 which are bolted or otherwise secured to the bars 12. These loops also are preferably formed of flat spring bars and extend slightly above and below the bumper bars, to which they are secured by bolts or rivets or as desired.

The extreme ends of the bumper also are preferably supported from the side frames 12 of the car by curved braces 14, of flat steel bars, bolted, riveted or clamped flatwise at one end to the rear face of the ends 11 of the bumper, and at the other end to the side frames 12 of the car chassis.

Figs. 7, 8 and 9 show another method of attaching the spring bumper supports to the car frame. Difficulty is sometimes encountered in positioning such support so that its front portion will be vertical. This may be due to irregularities in the manufacture of the support itself or to the different curvatures of the projecting ends of the channel bars of the automobile frame. In the arrangement here shown the support may be readily adapted to any ordinary car and accurately positioned thereon with respect to the verticality of its front face. Thus the rearwardly extending member 15 of the spring support as shown in Fig. 7 is bent substantially on the arc of a circle. An adapter or filler block 16, which may be of cast metal with its upper surface curved corresponding to the curve of the ends 15 of the support, is placed between the ends 15 and the channel 12. The lower face of the adapter 16, is curved to fit the bar 12. This arrangement can be made to fit various cars by sliding the adapter along the end of the channel more or less and positioning the support thereon so that its front face is vertical. If the channel varies considerably from the usual model another adapter may be used, by shifting the position slightly along the channel and by varying the position of the support ends thereon, the same can be accommodated almost to any of the cars.

When the proper position is found the support is clamped at the forward end. This clamp comprises the side plates 17, the U-shaped wedge 18 fitting in between the upper and lower members 15, an L-shaped bolt 19 passing therethrough and through the eye of the eye-bolts 19ᵃ, and the cross-plate 20 beneath the channel end 12 which is secured in position by the nuts of the eye-bolt 19ᵃ and L-shaped bolt 19. By tightening these nuts the whole spring support and the adapter plate 16 are rigidly clamped at the forward end of the channel 12. The ends 15, at the rear are already provided with a bolt hole, so that after the forward clamping is accomplished as above described, the hole for the bolt 21 through the adapter 16 and the upper flange of the channel may be conveniently drilled using the hole through the spring end as a guide. The bolt 21 is then inserted and the fastening of the spring support completed.

While I have thus particularly described several different forms of my invention, it will be understood that various changes and alterations therefrom may be made without departing from the scope and principle of the same as set forth or intended to be set forth in the appended claims.

What I claim as new, and desire to secure by Letters Patent of the United States, is:

1. A bumper composed of two end portions and a middle portion, each such end portion comprising a single integral flat bar formed to provide two vertically spaced horizontally parallel bars and an interconnecting end bar, said middle portion serving to connect the two end portions.

2. A bumper having two substantially horizontally parallel bars and an end portion interconnecting said bars, said end portion overlapping said horizontal bars and being continuous and integral with the same.

3. A bumper having end portions, each end portion composed of two substantially parallel bars and a continuous integral interconnecting end bar, and means simulating a fanciful design to connect said two end portions.

4. A bumper consisting of two flat metal bars extending substantially horizontally and transversely of the vehicle, said bars being connected at their outer ends by vertical portions formed by folding one of the bars flatwise obliquely from the horizontal position into the vertical position and likewise reversely back to form the other horizontal bar.

5. A bumper for automobiles having an end portion comprising two substantially horizontal transversely extending portions and a substantially vertical portion connecting the outer ends of said transversely extending portions, said two horizontally extending portions and said vertical portion being formed of an integral flat faced bar, each of said flat faced transversely extending portions lying in a vertical plane.

6. A bumper for automobiles having an end portion comprising two substantially horizontal transversely extending portions and a substantially vertical portion connecting the outer ends of said transversely extending portions, said two horizontally extending portions and said vertical portion being formed of an integral flat bar, each of said flat transversely extending portions lying in a vertical plane, and said flat vertical portion lying in a transversely extending plane.

7. A bumper for automobiles having an end portion comprising two substantially horizontal transversely extending portions and a substantially vertical portion connecting the outer ends of said transversely extending portions, said two horizontally extending portions and said vertical portion being formed of an integral flat bar, each of said flat transversely extending portions lying in a vertical plane, said end portion being so formed that the front face of the vertical portion is a continuation of the rear faces of the horizontally extending portions.

8. A bumper for automobiles having an end portion comprising a horizontal transversely extending portion, and a substantially vertical portion united with the outer end of said transversely extending portion, said portions being formed of an integral flat faced bar, said horizontal portion lying in a substantially vertical plane, and said vertical portion lying in a transversely extending plane.

9. A bumper for automobiles having an end portion comprising a horizontal transversely extending portion, and a substantially vertical portion united with the outer end of said transversely extending portion, said portions being formed of an integral flat bar, said flat horizontal portion lying in a substantially vertical plane, and said vertical portion lying in a transversely extending plane, said end portion being so formed that the front face of the vertical portion is a continuation of the rear face of the horizontal portion.

10. A two-bar bumper for automobiles comprising two end portions overlapping at their inner ends and secured together to form a complete bumper member, each such end portion comprising two vertically spaced bars with end connecting members formed from a single flat metal bar bent intermediate its ends to form the two bars and interconnecting end members.

11. A two-bar bumper for automobiles comprising two end portions overlapping at their inner ends and secured together to form a complete bumper member; each such end portion comprising two vertically spaced flat metal bars connected at their outer ends by a vertical integral portion formed by folding one of the bars flatwise obliquely from the horizontal into the vertical position and likewise reversely back to form the other horizontal bar.

12. A bumper for automobiles comprising two substantially horizontal flat bars and vertical end members forming a continuation of said horizontal bars, supports for said horizontal bars projecting from the frame of the vehicle, and end braces extending between and secured to said vertical end members and to the frame of the vehicle.

13. A bumper for automobiles, each end portion of said bumper being formed of an upper horizontal bar of flat faced steel bent flatwise obliquely from the horizontal into the vertical position and likewise reversely back to form a lower horizontal bar.

14. An automobile bumper comprising a duplex impact member consisting of two transversely extending spring bars set vertically edgewise in substantially the same vertical plane and spaced apart in that plane, both said bars being reflexed rearward at both ends to form end loops for guarding the vehicle wheel, the two bars being integral throughout said loops, being flexed vertically to merge with each other at the inner ends of the loops.

15. An automobile bumper comprising a duplex impact member consisting of two transversely extending spring bars set vertically edgewise in substantially the same vertical plane and spaced apart in that plane, both said bars being reflexed rearward at both ends of the bumper, the upper bar portion then extending downwardly and the lower bar portion similarly extending upwardly and meeting said upper bar portion.

16. An automobile bumper comprising a duplex impact member consisting of two transversely extending spring bars set vertically edgewise in substantially the same vertical plane and spaced apart in that plane, both said bars being reflexed rearward at both ends of the bumper, the upper bar portion then extending downwardly and meeting the lower bar portion.

17. An automobile bumper comprising a duplex impact member consisting of two transversely extending spring bars set vertically edgewise in substantially the same vertical plane and spaced apart in that plane, both said bars being reflexed rearward at both ends of the bumper, the upper bar portion then extending downwardly substantially in a vertical plane parallel to the aforementioned vertical plane and the lower bar portion similarly extending upwardly and meeting said upper bar portion.

18. An automobile bumper comprising a pair of vertically spaced impact bars having superposed complementary rounded portions directed rearwardly at their respective ends, the extremity of the rounded portion of one bar being fixed to the extremity of the corresponding rounded portion of the other bar.

19. An automobile bumper comprising a pair of vertically spaced impact bars having superposed complementary rounded portions directed rearwardly at their respective ends, the extremities of the rounded portions of the bars being formed integral with end portions connecting said rounded portions.

20. A vehicle bumper comprising a pair of flat faced vertically spaced impact bars having superposed complementary rearwardly curved portions at their respective ends, the extremity of the curved portions of the bars being formed integral with a flat faced end portion connecting said curved extremities.

21. A vehicle bumper comprising a pair of vertically spaced horizontal impact members formed of flat faced bars, the extremities of the bars being formed integral with a flat faced end portion connecting said horizontal members.

22. A vehicle bumper having end portions each end portion being composed of two substantially parallel bars and a continuous integral interconnecting end bar, and means to unite said two end portions.

23. A vehicle bumper comprising two substantially horizontal vertically spaced bars, means interconnecting the ends of said bars near the extremities of the bumper, and supporting and reinforcing resilient bars extending from said interconnecting means directly toward and attached to a portion of the vehicle.

24. A vehicle bumper comprising two transversely extending vertically spaced spring bars curved rearwardly at their extremities, means interconnecting said bars at their extremities, and reinforcing members having one end attached to said interconnecting means at points intermediate said spring bars and having another end attached to the vehicle.

25. A vehicle bumper comprising two substantially horizontal transversely extending vertically spaced spring bars forming an impact area and curved rearwardly at their extremities, vertically set means at the rear of the plane of said impact area for interconnecting said bars adjacent their extremities, and resilient reinforcing members extending between and secured to said vertically set means and to the vehicle frame.

26. A vehicle bumper comprising two substantially horizontal transversely extending vertically spaced spring bars forming an impact area and curved rearwardly at their extremities, vertically set means at the rear of the plane of said impact area for interconnecting said bars adjacent their extremities, and resilient reinforcing members extending between and secured to said vertically set means and to the vehicle frame, said bars and said reinforcing members being formed of flat strips lying substantially wholly in vertical planes.

27. A vehicle bumper comprising a pair of substantially horizontal vertically spaced bars forming an impact area, said bars having superposed complementary rearwardly curved portions at their respective ends, and means to the rear of the plane of said impact area for interconnecting the corresponding extremities of the curved portions of the respective bars.

28. A vehicle bumper supporting bracket having an inner end portion for attachment to an extending portion of the vehicle framework, said end portion of the bracket having its lower surface normally formed on the arc of a circle and upwardly convex, upwardly convex means on the framework also formed on the arc of a circle of equal radius, whereby said bracket may be fitted thereon in any desired angular position in respect to the framework, and means for clamping said bracket to the frame of chassis in any adjusted position.

29. The automobile buffer element formed of steel strip having vertically displaced portions, and an integral connector portion having junction folds extending angularly across the strip and joining said vertically displaced portions thereto without substantial edgewise bending.

30. The automobile buffer element formed of wide thin steel strip and having vertically displaced portions and an integral interposed connector portion of the strip having a junction fold extending angularly across the strip.

31. A vehicle bumper having two vertically wide vertically separated substantially horizontal front bars arranged in substantially the same vertical plane at their central portions and having at both ends obliquely folded vertically extending integral end connections holding the adjacent portions of the front bars in oppositely inclined position.

32. A vehicle bumper having two vertically separated substantially horizontal parallel front bars arranged in substantially the same vertical plane at their central portions and having rearwardly curved ends and obliquely folded end connections holding the adjacent parts of the front bars in vertically inclined position.

33. A vehicle bumper having two vertically separated substantially parallel flat front bars formed with diagonally folded vertically extending end connections holding the adjacent end portions of the front bars in vertically inclined position.

34. The automobile bumper front element having separated flat front bars arranged throughout part of their length in the same plane and inclined to each other adjacent the end of the element and there joined by a folded integral end connection.

35. The automobile bumper front element having vertically separated front bars vertically inclined to each other adjacent the end of the element and joined by a rearwardly folded end connection.

36. The automobile bumper front element having an obliquely folded end connection and integral vertically separated flat front bars oppositely inclined to each other adjacent the end connection.

37. The automobile bumper element having a rearwardly extending end connection and integrally connected separated flat bars inclined to each other for substantial distances adjacent the end connection and arranged in substantially the same plane at other parts.

38. A vehicle bumper element having a vertically wide substantially horizontally extending front bar and vertically disposed integral end portions joined to the front bar by junction folds extending obliquely across the bar, substantial lengths of the horizontally extending front bar being inclined from the vertical adjacent said junction folds.

39. A vehicle bumper having two vertically wide vertically separated substantially horizontally extending front bars having substantial lengths of their end portions oppositely inclined from the vertical and interconnected.

40. A vehicle bumper having two vertically wide vertically separated substantially horizontally extending front bars arranged in substantially the same vertical plane at their center portions and having substantial lengths of their end portions oppositely inclined from the vertical.

41. The automobile buffer comprising connected front elements formed of steel strip and each having vertically displaced substantially horizontally extending front portions and an integral connector portion at the end of the element comprising a recurving bend and adjacent rearwardly bent oppositely inclined parts of said front portions and cooperating buffer supporting members.

42. The automobile buffer comprising connected front elements formed of steel strip and each having vertically displaced front portions and an integral connector portion at the end of the element and adjacent oppositely inclined parts of said front portions.

43. The automobile buffer front comprising two adjustably connected similar elements formed of wide thin steel strip and having vertically displaced horizontally extending front members having a transversely extending integral connector portion bent to hold the adjacent rearwardly bent horizontal portions of said members at oppositely inclined vertical angles with each other adjacent said transverse portion and gradually approaching vertical alignment at points further from said transverse connector portion.

44. The automobile buffer front element formed of relatively wide steel strip and having vertically displaced horizontally extending front members having portions in substantial vertical alignment with each other and having a recurved integral connector portion bent to hold the adjacent rearwardly bent horizontal portions of said members at opposing vertical angles with each other while gradually approaching vertical alignment at inner points.

45. The automobile buffer front element formed of relatively wide steel strip and having vertically displaced front members having a recurved integral connector portion bent to hold the adjacent portions of said members at opposing vertical angles with each other.

46. The automobile buffer front element formed of wide thin steel strip having vertically displaced front portions and an integral connector portion, said connector portion having its inner front edges vertically separated to a less extent than the corresponding rear edges of said connector portion and said front portions being oppositely inclined adjacent said connector portion.

47. The automobile buffer element formed of wide steel strip having horizontally extending members provided with vertically displaced portions and an integral recurved connector portion extending rearward from the plane of said horizontally extending portions of said members, said connector portion having its inner front edges vertically separated to a considerably less extent than the corresponding rear edges of said connector portion.

48. The buffer element formed of relatively wide steel strip having transversely displaced body portions and an integral connector portion at the end of the element comprising a recurved bend and adjacent rearwardly bent parts of said body portions which are oppositely inclined to each other, said body portions coming into transverse alignment at points further removed from said connector portion, said connector portion having its inner front edges transversely separated to a considerably less extent than the corresponding rear edges of said connector portion.

In witness whereof, I have hereunto subscribed my name.

RICHARD TOSSELL.